April 17, 1962 G. MOHRING 3,029,491
APPARATUS FOR PREPARING UNDULATED
WEBS OF WOVEN MATERIAL
Filed July 28, 1959 2 Sheets-Sheet 1
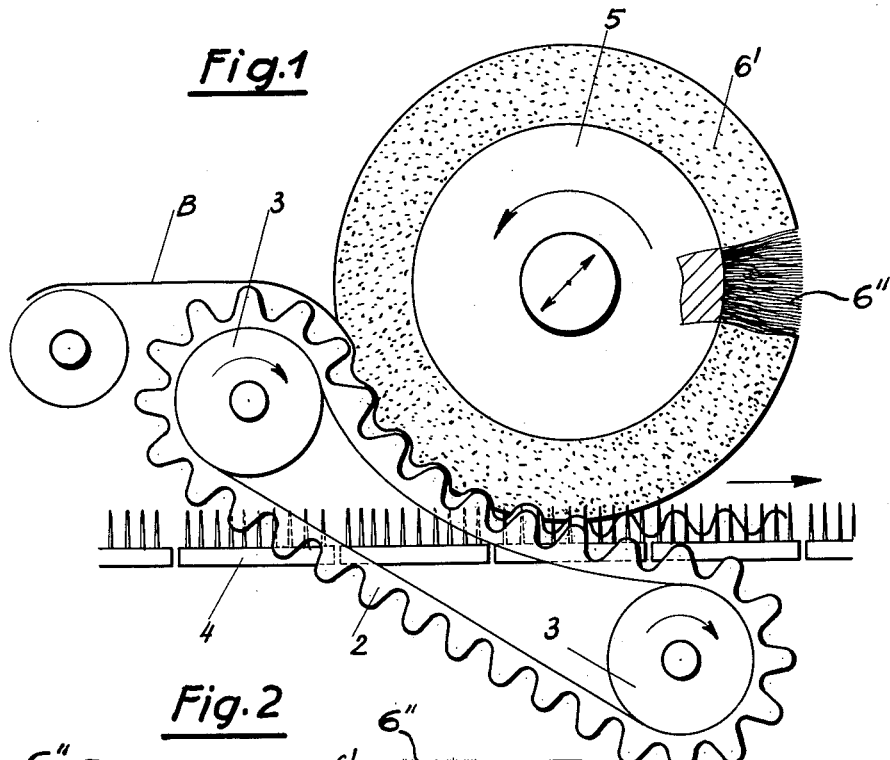
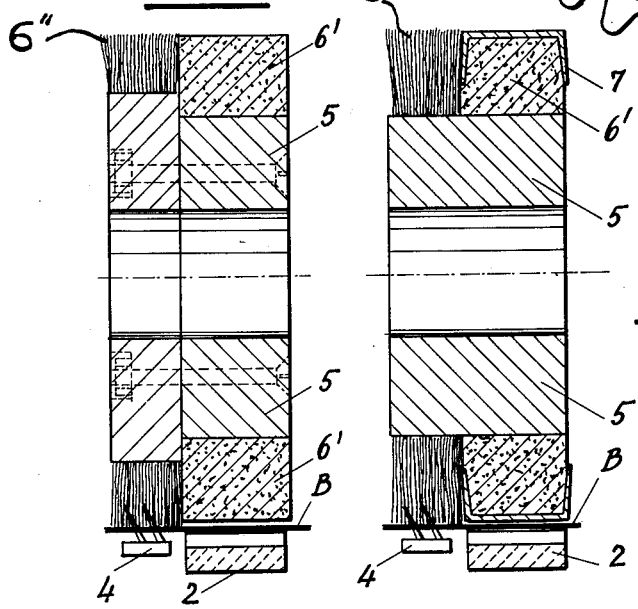
INVENTOR.
Gustav Mohring
BY Michael S. Strike
Attorney

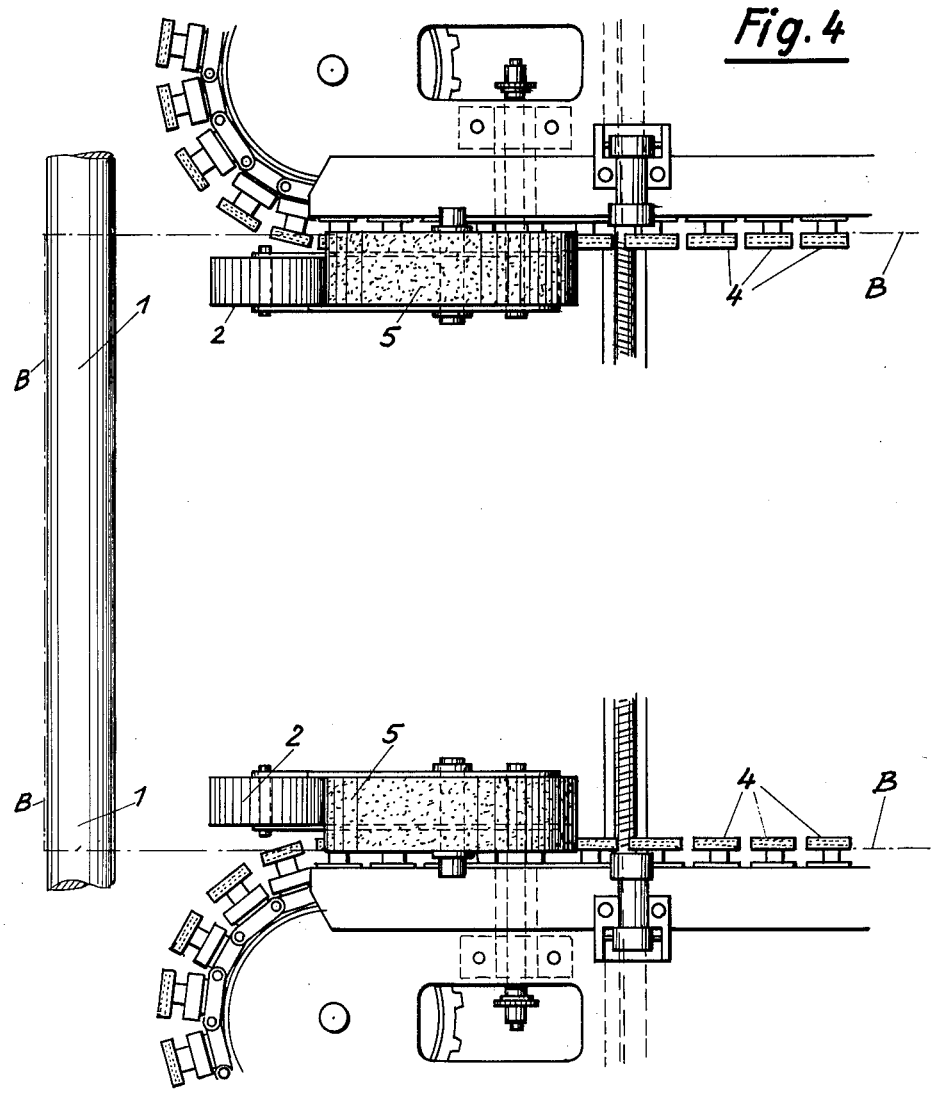

United States Patent Office 3,029,491
Patented Apr. 17, 1962

3,029,491
APPARATUS FOR PREPARING UNDULATED WEBS OF WOVEN MATERIAL
Gustav Mohring, 3 Salzmannweg, Stuttgart-N, Germany
Filed July 28, 1959, Ser. No. 830,044
6 Claims. (Cl. 26—57)

This invention relates to certain new and useful improvements in an apparatus for preparing uniformly undulated webs of woven material and is a continuation-in-part of the application "Device for the Manufacture of Undulated Sheets of Textile Material," filed by me on November 26, 1956, Serial No. 624,451, now U.S. Patent No. 2,961,735, and embodies improvements in the art thereover.

My application mentioned above refers to an apparatus having an endless toothed belt arranged at each edge of a web of woven material and cooperating with one or more pulleys in such a manner that an excessively fed web of woven material is pressed into the endless toothed belts and immediately thereafter into an associated conveyor chain of a tentering machine.

With this apparatus it is possible to attain a uniform undulation at a low mechanical outlay and at the same time to transfer the undulated web onto a tenter chain carrying needles or grippers.

The pulleys are provided with a brush rim forming a resilient layer which is necessary for continuously pressing the web into the gaps between the teeth of the endless toothed belts.

Experience has proven that this brush rim does not always possess sufficient resiliency so as to fully press the web into the gaps between the teeth of its endless toothed belt, particularly in the case of deep undulations, so that the undulations produced have a depth smaller than that of the gaps between the teeth of the endless toothed belt.

The present invention overcomes this disadvantage in that the resilient layer mounted circumferentially on the pulleys consists of a rim of foamed material, such as moss rubber or foamed rubber, foamed plastic or the like, extending at least in the region of the endless toothed belts, whereas the portion of the pulleys serving for fixing the web onto needles or grippers of a tenter chain is constructed in known manner as a brush.

With these improved pulleys it is possible to readily form deep undulations extending closely one behind the other which are capable of being pressed into tenter chains of all types.

To avoid decolorizing of the edges of the web by treating agents, which may have been sucked up by the rim of foamed material, a resilient coating which is not porous, such as a ring of soft rubber or the like, is applied to the rim of foamed material in such a manner that it covers as a film the circumference and the lateral surfaces of the rim of foamed material.

A preferred embodiment of the invention is illustrated in the accompanying drawings, in which FIG. 1 is a diagrammatic general side elevation of the apparatus, showing the improved pulleys fixing the web of woven material onto needles of a tenter chain;

FIG. 2 is a cross-sectional view of the dual pulley of FIG. 1;

FIG. 3 is a cross-sectional view of another embodiment of the dual pulley of FIG. 2;

FIG. 4 is a fragmentary plan view of the arrangement according to the present invention and will serve to illustrate the feeding of the textile sheet to the apparatus of the present invention, a brush 5 thereof representing either the brush of FIG. 2 or FIG. 3.

Referring to the drawings, reference numeral 5 indicates rotatable pulleys which constitute combined forcing and attaching means and are arranged above shaping transporting means including two endless toothed belts 2 and meshing therewith. An excessively fed web of woven material B passes between the endless toothed belts 2, moving around pulleys 3, and the pulleys 5 which are displaceable in relation to the endless toothed belts 2. The pulleys 5 also have engagement with tangentially approaching needles or grippers carried by a tenter chain 4 and forming a receiving transporting means which conveys the undulated web B away from the belts 2 in the direction of the arrow. The portion of the pulleys 5 cooperating with the belts 2 is provided with a resilient layer or rim $6^1$ consisting of foamed material, such as foamed rubber, foamed plastic or the like, applied circumferentially on to the pulleys 5. In the case of a tenter chain carrying needles as shown in FIG. 1, it is preferred to arrange a brush roll 6" coaxially with each rim $6^1$ and between the rims $6^1$ above the needles in order to avoid that this part of the pulleys 5 be damaged by the needles. The rims $6^1$ of foamed material and the brush roll 6" may have a common hub as may be seen in FIG. 3. When grippers are used the rim $6^1$ of foamed material may extend over the entire width of the pulleys 5.

To eliminate the danger of decolorizing the edges of the web passing through between the belts 2 and the pulleys 5, each rim $6^1$ of foamed material can be covered with a resilient coating, such as a hose-like member 7 (FIG. 3) of soft rubber or the like, having a greater width than the rim $6^1$. This hose-like member 7 is applied to the rim $6^1$ under initial tension so that it is firmly held thereon and at the same time its edge portions projecting on both sides closely engage and cover the lateral surfaces of the rim $6^1$, as shown in FIG. 3.

Instead of applying a particular hose-like member the rim $6^1$ can also be manufactured in such a manner that it has a film-like surface which is not or only less porous and serves the same purpose.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. An apparatus for undulating a textile sheet and for transferring it to transporting means comprising, in combination, shaping transporting means having an undulated surface and adapted to transport said sheet during undulation thereof to a predetermined point; receiving transporting means having holding means thereon and adapted to transport the sheet undulated by said shaping transporting means from said predetermined point while the undulations obtained by said shaping transporting means are maintained; and combined forcing and attaching means including pulley means having an annular rim portion formed of resilient foamed material adapted to press against said undulated surface in advance of and up to said predetermined point for forcing the textile sheet into contact with said undulated surface so as to undulate said textile sheet, said combined forcing and attaching means also including means for attaching in the region of said predetermined point said undulated sheet to said holding means of said receiving transporting means, whereby the undulations of said sheet remain unchanged during transfer of the undulated sheet from said shaping transporting means to said receiving transporting means.

2. An apparatus for undulating a textile sheet and for transferring it to transporting means comprising, in combination, shaping transporting means including an endless toothed belt having an undulated surface and adapted to transport said sheet during undulation thereof to a predetermined point; receiving transporting means having holding means thereon and adapted to transport the sheet undulated by said shaping transporting means from said predetermined point while the undulations obtained by said shaping transporting means are maintained; and combined forcing and attaching means including pulley means having an annular rim portion formed of foam rubber adapted to press against said undulated surface in advance of and up to said predetermined point for forcing the textile sheet into contact with said undulated surface so as to undulate said textile sheet, said combined forcing and attaching means also including means for attaching in the region of said predetermined point said undulated sheet to said holding means of said receiving transporting means, whereby the undulations of said sheet remain unchanged during transfer of the undulated sheet from said shaping transporting means to said receiving transporting means.

3. An apparatus for undulating a textile sheet and for transferring it to transporting means comprising, in combination, shaping transporting means including an endless toothed belt having an undulated surface and adapted to transport said sheet during undulation thereof to a predetermined point; receiving tenter chain means having needles thereon and adapted to transport the sheet undulated by said shaping transporting means from said predetermined point while the undulations obtained by said shaping transporting means are maintained; and combined forcing and attaching means including pulley means having an annular rim portion formed of foamed plastic material adapted to press against said undulated surface in advance of and up to said predetermined point for forcing the textile sheet into contact with said undulated surface so as to undulate said textile sheet, said combined forcing and attaching means also including means for attaching in the region of said predetermined point said undulated sheet to said needles of said receiving tenter chain means, whereby the undulations of said sheet remain unchanged during transfer of the undulated sheet from said shaping transporting means to said receiving tenter chain means.

4. An apparatus for undulating a textile sheet and for transferring it to transporting means comprising, in combination, shaping transporting means having an undulated surface and adapted to transport said sheet during undulation thereof to a predetermined point; receiving transporting means having holding means thereon and adapted to transport the sheet undulated by said shaping transporting means from said predetermined point while the undulations obtained by said shaping transporting means are maintained; and combined forcing and attaching means including pulley means having an annular rim portion having a peripheral face and formed of resilient foamed material and of a continuous resilient layer covering said peripheral face of said annular rim portion formed of resilient formed material, said pulley means being adapted to press against said undulated surface in advance of and up to said predetermined point for forcing the textile sheet into contact with said undulated surface so as to undulate said textile sheet, said combined forcing and attaching means also including means for attaching in the region of said predetermined point said undulated sheet to said holding means of said receiving transporting means, whereby the undulations of said sheet remain unchanged during transfer of the undulated sheet from said shaping transporting means to said receiving transporting means.

5. An apparatus for undulating a textile sheet and for transferring it to transporting means comprising, in combination, shaping transporting means having an undulated surface and adapted to transport said sheet during undulation thereof to a predetermined point; receiving transporting means having holding means thereon and adapted to transport the sheet undulated by said shaping transporting means from said predetermined point while the undulations obtained by said shaping transporting means are maintained; and combined forcing and attaching means including first pulley means having an annular rim portion formed of resilient foamed material adapted to press against said undulated surface in advance of and up to said predetermined point for forcing the textile sheet into contact with said undulated surface so as to undulate said textile sheet, and also including second pulley means coaxial with said first pulley means and including a brush-like annular rim portion for attaching in the region of said predetermined point said undulated sheet to said holding means of said receiving transporting means, whereby the undulations of said sheet remain unchanged during transfer of the undulated sheet from said shaping transporting means to said receiving transporting means.

6. An apparatus as defined in claim 4 wherein said rim portion includes an outer cylindrical face and substantially plane lateral faces and wherein said continuous resilient layer covers said entire cylindrical face and at least portions of said lateral faces adjacent to said cylindrical face.

References Cited in the file of this patent

UNITED STATES PATENTS

| 2,577,880 | Dodge | Dec. 11, 1951 |

FOREIGN PATENTS

| 791,431 | France | Sept. 30, 1935 |
| 644,128 | Germany | Apr. 24, 1937 |
| 656,685 | Germany | Feb. 12, 1938 |
| 101,837 | Sweden | June 23, 1941 |